June 14, 1966 A. J. DE PIETRO 3,256,523

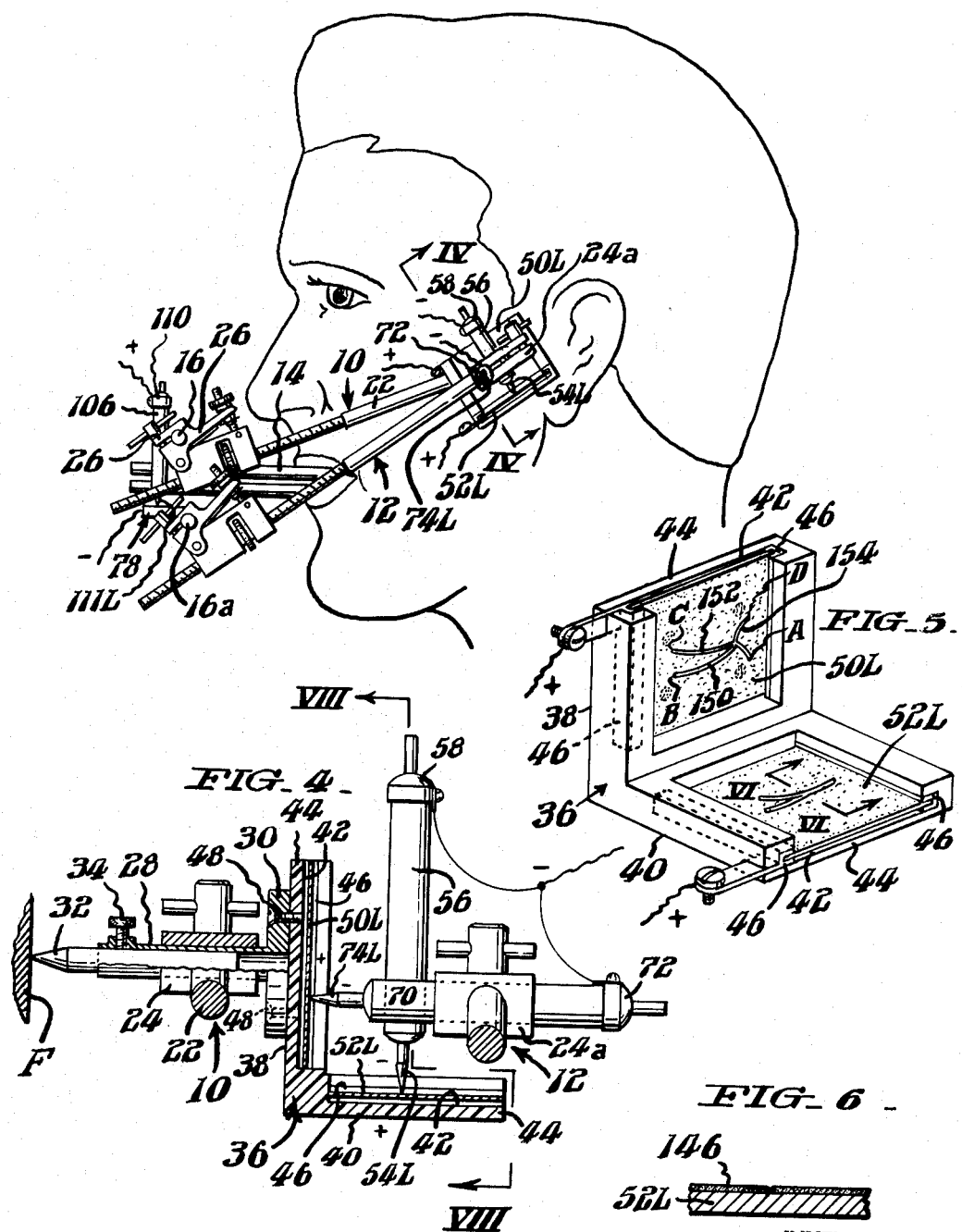

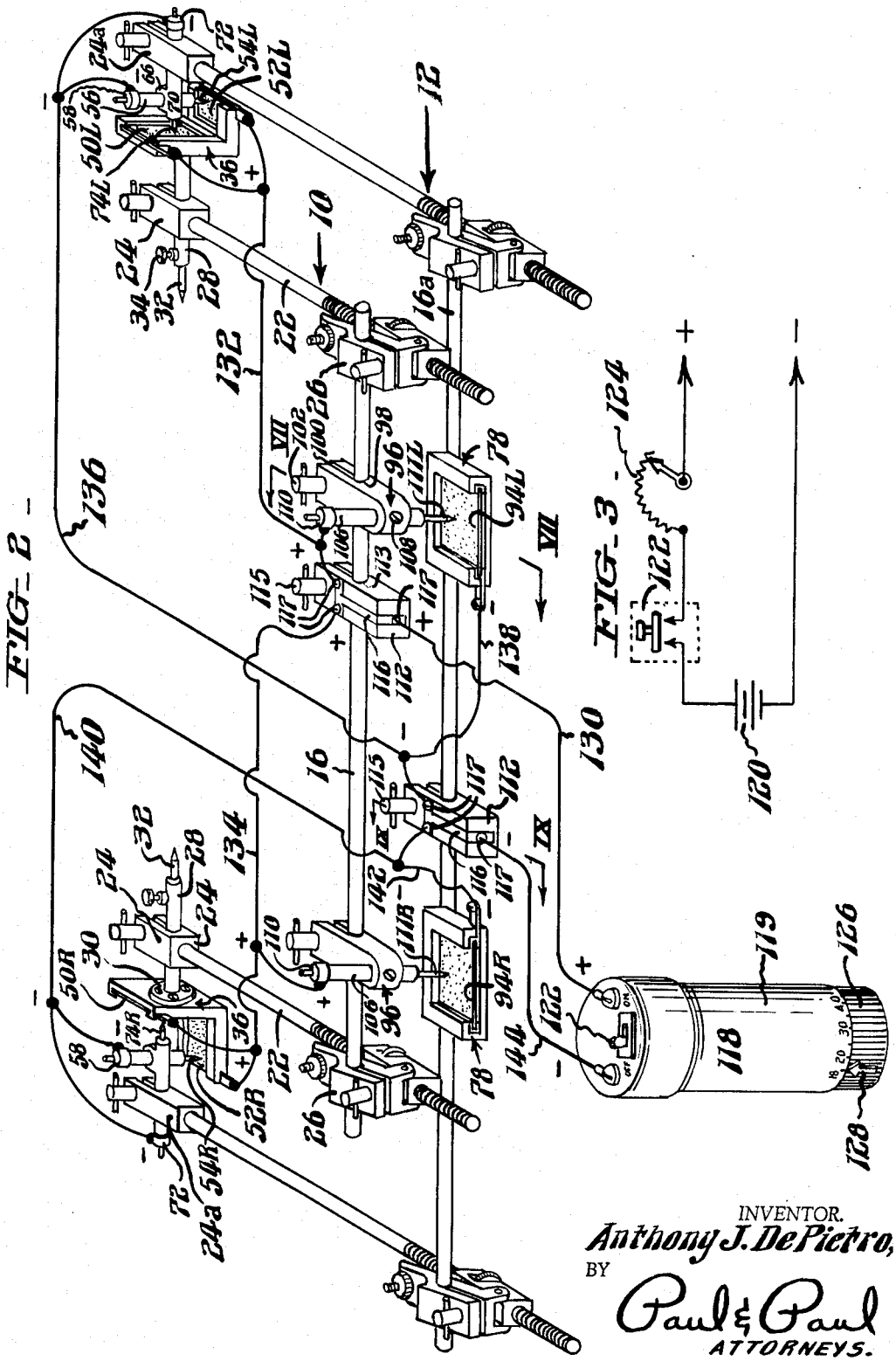

RECORDING INSTRUMENT

Filed Oct 23, 1963

3 Sheets-Sheet 3

INVENTOR.
Anthony J. De Pietro
BY
Paul & Paul
ATTORNEYS.

United States Patent Office 3,256,523
Patented June 14, 1966

3,256,523
RECORDING INSTRUMENT

Anthony J. De Pietro, Springfield, Pa., assignor to Medical Electronics and Research Corporation, Camden, N.J., a corporation of New Jersey
Filed Oct. 23, 1963, Ser. No. 318,291
3 Claims. (Cl. 346—44)

This invention relates generally to dental apparatus and particularly to a recording instrument for use in the fabrication of artificial dentures.

In the fabrication of artificial dentures, it becomes necessary to record protrusive and lateral movements of the mandible relative to the maxilla. For this purpose a recording instrument may be used which mounts record plates and coacting styluses in selected positions relative to the jaws. The patient is instructed to execute a straight protrusive movement, whereupon the styluses record the movement upon the plates by making traces thereon. After the traces are made, the styluses are raised from the plates, and the patient is instructed to return to centric position. This done, the styluses are returned to their initial positions. The patient is then instructed to execute a lateral movement to one side and then to the other, and these further movements are recorded in the same manner. This common practice has not proved to be entirely satisfactory for a number of reasons. The operator has no assurance that all of the traces made simultaneously start at the same moment and terminate at the same moment. In addition, several operators are necessary for proper handling of the styluses. Furthermore, in order to check a set of plates, two sets of styluses are necessary, one to make the traces and another to follow the traces without marking the plates. It will be appreciated that changing the styluses is a nuisance. Normally, the operator must prepare the surfaces of the record plates so that they will take traces or treat the plates after the styluses have moved over them so that the traces will show. Preparing and treating the plates is a nuisance too. Springs, rubber bands or magnets are commonly used in order to press the styluses against the plates firmly enough to mark the plates. This tends to distort the plates.

Accordingly, the object of the invention is to provide a recording instrument which avoids the difficulties pointed out hereinabove.

Figure 7:
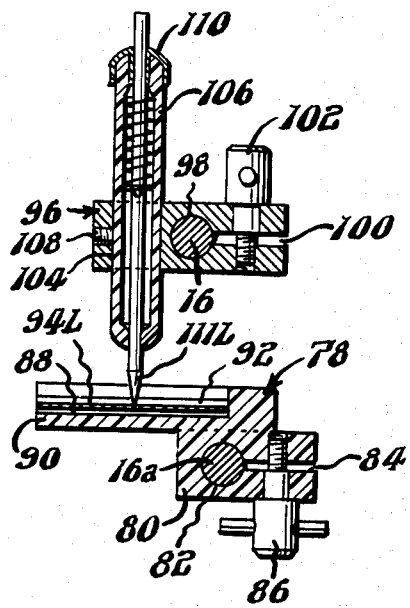
Figure 8:
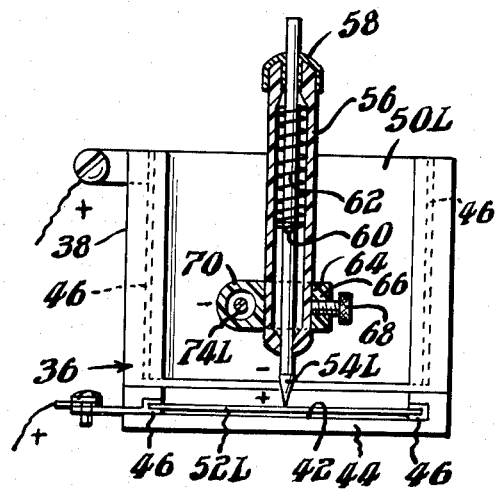
Figure 9:
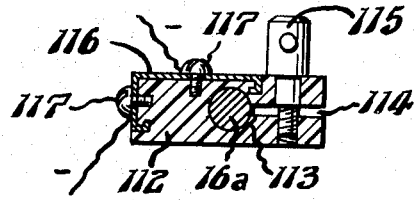
Figure 10:
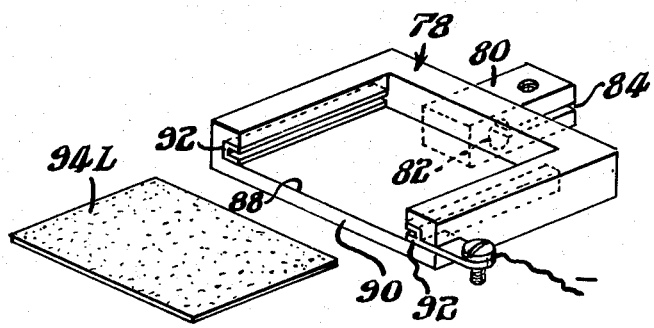

Other objects of the invention will become apparent when the following description is read with reference to the accompanying drawings, in which:

FIG. 1 is a side view of an instrument constructed in accordance with the invention;
FIG. 2 is a perspective view (partially diagrammatic) of the instrument, part being omitted for the sake of clarity;
FIG. 3 is a wiring diagram;
FIG. 4 is an enlarged section on line IV—IV in FIG. 1;
FIG. 5 is a perspective view of a record holder;
FIG. 6 is an enlarged section on line VI—VI in FIG. 5;
FIG. 7 is an enlarged section on line VII—VII in FIG. 2;
FIG. 8 is an elevation, partially in section, on line VIII—VIII in FIG. 4;
FIG. 9 is an enlarged section on line IX—IX in FIG. 2; and
FIG. 10 is an exploded perspective view of a record holder and record plate.

The following description is directed to the specific form of the invention illustrated in the drawings and is not intended to be addressed to the scope of the invention itself, which may be practiced in a variety of forms.

A recording instrument constructed in accordance with the invention comprises a pair of frames movable relative to each other and respectively mounting means which coact to record such movements.

Referring particularly to FIGS. 1 and 2, the frames may be identical dental face bows respectively designated 10 and 12. Each face bow comprises a mouthpiece including a tray (not shown) mounted on the end of a horizontally extending bar 14 affixed by a clamp (not shown) to a horizontally extending crossbar 16. Extending laterally respectively from opposite ends of the crossbar 16 are a pair of condyle locating arms 22. Each arm 22 terminates at one end in a clamp 24 and at the other end means 26 connecting the condyle locating arm to the crossbar 16. As thus far described, the dental face bow is identical with the one described in my Patent No. 3,056,210, issued October 2, 1962, to which reference may be had for a more detailed description. It will be understood, however, that it is not intended to be limited to the specific construction of the face bow referred to.

Referring particularly to FIGS. 1, 2, 4, 5 and 8, held in each clamp 24 of the face bow 10 is a sleeve 28 which is provided with an external flange 30. Slidably received by the sleeve 28 is a pointed condyle pin 32 secured against axial shifting movement by a screw 34. Carried by the flange 30 is a record plate holder 36 which is made of a dielectric material. The holder comprises an upright part 38 and a part 40 extending laterally therefrom. Each of the parts 38 and 40 is provided with a depressed area 42 which forms a comparatively thin base wall 44. Embedded in the part 38, respectively on opposite sides of the depression, are channel elements 46 made of a material which is a conductor of electricity. The holder 36 is affixed to the flange 30 by means of screws 48. The parts 38 and 40 carry a pair of record plates respectively designated 50L and 52L on one side of the instrument and 50R and 52L on the other side, each plate being slidably received between the flanges of the associated channel elements 46.

Referring particularly to FIGS. 4 and 8, overlying the record plate 52L is a pointed stylus 54L which is slidably received by a tubular holder 56 which is made of a dielectric material and a cap 58 which is made of a material which is a conductor of electricity. Extending through the stylus is a pin 60, and between the pin 60 and the top of the tubular holder 56 is a compression spring 62. The tubular holder 56 extends through an aperture 64 formed in a boss 66 and is secured against axial shifting movement by a screw 68. The boss 66 extends laterally from a tubular holder 70 which is provided with a cap 72. Slidably received by the tubular holder 70 and the cap 72 is a stylus 74L spring-pressed against the plate 50L. The tubular holder 70 is clamped in position by the associated clamp 24a of the face bow 12. The arrangement on the opposite side of the instrument is similar, the styluses being designated 54R and 74R.

Carried by the crossbar 16a of the face bow 12 are a pair of record plate holders, generally designated 78, made of a dielectric material. Each includes a clamp part 80 provided with an aperture 82, through which the crossbar 16a extends, and a split 84. The clamp is tightened upon the crossbar 16a by a screw 86. The record holder is provided with a depression 88 which forms a comparatively thin base wall 90. Embedded in the record holder, respectively on opposite sides of the depression, are channel elements 92 made of a material which is a conductor of electricity. The record holders 78 carry a pair of record plates respectively designated 94L and 94R, each slidably received between the flanges of the associated channel elements 92.

Carried by the crossbar 16 of the face bow 10 are a pair of clamps, generally designated 96, made of a dielectric material. Each clamp is provided with an aperture 98 through which extends the crossbar 16. The clamp is split, as at 100, and is drawn tight about the crossbar 16 by a screw 102. The clamp is provided with an aperture 104 through which extends a tubular holder 106 secured in position by a screw 108. The holder is provided with a cap 110. Slidably received by the holders 106 and caps 110 are a pair of styluses, respectively designated 111L and 111R, spring-loaded as described hereinbefore, for engaging the underlying plates 94L and 94R.

Mounted upon each of the crossbars 16 and 16a is a clamp 112 made of dielectric material. The clamp is provided with an aperture 113 through which the crossbars extend. The clamp is split, as at 114, and is drawn tight about the crossbars by a screw 115. The clamp carries a contact element 116 which is made of a material which is a conductor of electricity. The contact is secured in position by screws 117.

Referring particularly to FIG. 2, a power pack, generally designated 118, is provided with a suitable casing 119 of a size and shape for being held in one hand of the operator. The casing houses a battery 120. On the top of the casing is an on-off switch 122. At the bottom is a rheostat 124 which may be adjusted by turning the dial 126 bearing the indicator 128. A wire 130 connects the positive side of the battery to the contact 116 carried by the crossbar 16 associated with the face bow 10. The contact 116 is connected to the record plates 50L and 52L and to the stylus 111L through a wire 132. It is also connected to the record plates 50R and 52R and to the stylus 111R through a wire 134. The styluses 54L and 74L are connected to the contact 116 associated with the face bow 12 through a lead 136, and the record plate 94L is connected to the contact through a lead 138. The styluses 54R and 74R are connected to the contact through a wire 140, and the record plate 94R is connected to the contact through a wire 142. The contact is connected to the negative side of the battery by a wire 144. The battery 120 preferably develops between eighteen and forty volts, and it will be understood that each of the record plates, preferably made of hard aluminum foil 0.010 of an inch thick, is provided with an electro-sensitive coating or film of material 146. Sheet material found suitable for the intended purpose is disclosed by U.S. Patent No. 3,138,547, issued to B. L. Clark, June 23, 1964.

In the use of the recording device, the hinge axis of the patient is located by known means and opposite sides of the patient's face, designated F, are tattooed to indicate the location thereof. Then with the face bow 10 assembled as shown, the tray of the mouthpiece is suitably positioned in the patient's mouth and the patient instructed to close on the tray. With the tray adhering to the upper teeth, the necessary adjustments are made to bring the condyle pins 32 into registry with the marks on the patient's face.

Now with face bow 12 assembled as shown, the tray of the mouthpiece is suitably positioned in the patient's mouth and the patient instructed to close on the tray. With the tray adhering to the lower teeth, the necessary adjustments are made to cause the styluses 74L and 74R to register with the condyle axis and to bring the points of the several styluses into engagement respectively with the associated record plates.

Now switch 122 is turned to the "on" position to close the electric circuit. The patient is instructed to execute a straight protrusive movement. As the movement progresses the stylus 74L, for example, moves from A to B making trace 150. The switch 122 is now turned to the "off" position to reopen the electric circuit, and the patient is instructed to return to centric position. The stylus is returned to centric position in contact with the record plate, but the return movement leaves no trace on the record plate.

Now the circuit is reclosed, and the patient is instructed to execute a lateral movement to the right, whereupon the stylus 74L moves from A to C making trace 152. Again the circuit is opened and the patient is instructed to return to centric position. Again the return movement is executed without marking the plate.

Again the circuit is reclosed, and the patient is instructed to execute a lateral movement to the left, whereupon the stylus 74L moves from A to D making trace 154. Again the circuit is opened and the patient is instructed to return to centric position. Once again the return movement is executed without marking the plate. It will be understood that corresponding traces are made on each of the other plates.

It will be noted that the styluses are only very lightly spring-pressed against the record plates. Mere contact therewith is sufficient. Thus the pressure exerted upon the record plate is practically negligible in so far as its tendency to deform the plate is concerned. The formation of traces is started on all the record plates at the same instant and is terminated at the same instant, in consequence of which the operator has complete control by merely switching the current on and off. There is no need to raise a stylus after making a trace and before returning it to its initial position preliminarily to making a second trace. The styluses return to their initial positions in contact with the plates without marking the plates because during the return movement the current is off. When records are to be checked, there is no need for separate styluses for each plate, one to write and one to trace the path. One stylus does both, which is convenient and timesaving. A duplicate set of records can easily be made and the tracings checked for accuracy by using a comparator. The operator is free of any necessity to treat record plates before using them or after using them. There is no need for springs, rubber bands or magnets to enable the styluses to mark the plates. Mere contact without pressure is all that is necessary. There is no need for more than one operator, and in spite of this the time required for the operation is drastically reduced.

As indicated hereinbefore, the present invention, as described and shown, is susceptible to various changes and modifications which may be made without any departure from the general principles or real spirit of the invention. The record plates are not necessarily made of sheet aluminum. They could be made of paper or another material that is not a conductor of electricity. For example, Type 705 Electro-Sensitive chart recording paper, manufactured by Minnesota Mining & Manufacturing Company, might be used instead. They could also be made of light-sensitive paper suitably protected against general exposure to light. In this case, the stylus could include a light source mounted for movement therewith and capable of issuing a beam of light to activate the light-sensitive paper for making a trace thereon in spite of its protective covering. Accordingly, it is intended to claim the present invention broadly, as well as specifically, as indicated in the appended claims.

What is claimed is:

1. In a recording instrument for use in fabricating artificial dentures, the combination comprising a pair of separate frames respectively arranged for being fixed relative to the maxilla and mandible of the patient for movement therewith, a plurality of electrically conductive and electrosensitive record plates and coacting styluses mounted upon said frames for being disposed proximate the regions over the hinge joints of the patient's mandible when said frames are arranged in the manner aforesaid, means connecting said plates and styluses in electric circuit, and a single switch in said circuit operable for energizing all of said styluses simultaneously and deenergizing all of said styluses simultaneously, said plates being insensitive to pressure applied thereto when said styluses move thereover in response to relative movement of the patient's maxilla and mandible, but being sensitive to electric current for making traces on said plates when said styluses move thereover in response to relative movement of the patient's maxilla and mandible.

2. The combination according to claim 1 wherein the record plates and styluses are electrically insulated from said frames.

3. The combination according to claim 2 wherein the record plates consist of an electrosensitive layer overlying an electrically conductive layer.

References Cited by the Examiner

UNITED STATES PATENTS

| 1,799,528 | 4/1931 | Phillips | 32—19 |
| 3,056,210 | 10/1962 | De Pietro | 33—174 |
| 3,138,547 | 6/1964 | Clark | 346—135 X |
| 3,181,167 | 4/1965 | Mann | 346—74 |

LEO SMILOW, *Primary Examiner.*

JOSEPH W. HARTARY, *Assistant Examiner.*